(12) United States Patent
Clifton

(10) Patent No.: US 8,248,417 B1
(45) Date of Patent: Aug. 21, 2012

(54) FLATTENING 3D IMAGES

(75) Inventor: Michael O. Clifton, Scotts Valley, CA (US)

(73) Assignee: Adobe Systems Incorporated, San Jose, CA (US)

(*) Notice: Subject to any disclaimer, the term of this patent is extended or adjusted under 35 U.S.C. 154(b) by 1028 days.

(21) Appl. No.: 12/200,641

(22) Filed: Aug. 28, 2008

(51) Int. Cl.
*G06T 15/10* (2011.01)

(52) U.S. Cl. ........ 345/427; 345/419; 345/423; 345/585; 345/587; 345/648; 345/653

(58) Field of Classification Search .............. None
See application file for complete search history.

(56) References Cited

U.S. PATENT DOCUMENTS

| | | | | |
|---|---|---|---|---|
| 7,034,824 B2 * | 4/2006 | Maillot | ........................ | 345/423 |
| 7,236,167 B2 * | 6/2007 | Lee et al. | ...................... | 345/420 |
| 7,785,200 B2 * | 8/2010 | Nakajima | ....................... | 463/33 |

OTHER PUBLICATIONS

Gil Zigelman, et al., "Texture Mapping using Surface Flattening via Multi-Dimensional Scaling," Visualization and Computer Graphics, IEEE Transactions on vol. 8, Issue 2, Apr.-Jun. 2002 pp. 198-207.

Yih-Chuan Lin, et al., "Fast Flattening Algorithm for Non-developable 3D Surfaces," Nov. 24, 2006, 6 pages.
Zsolt Janko, et al., "Creating Entirely Textured 3D Models of Real Objects Using Surface Flattening," Machine Graphics & Vision, vol. 14, Issue 4 (Jan. 2005), pp. 379-398.
D. Martin, et al., "Flattening 3D Objects Using Silhouettes," The Eurographics Association and Blackwell Publishers, 2002.
Chakib Bennis, "Piecewise Surface Flattening for Non-Distorted Texture Mapping," ACM Computer Graphics, Jul. 1991, pp. 237-246.

* cited by examiner

*Primary Examiner* — Antonio A Caschera
(74) *Attorney, Agent, or Firm* — Robert C. Kowert; Meyertons, Hood, Kivlin, Kowert & Goetzel, P.C.

(57) ABSTRACT

Method, system, and computer-readable storage medium for flattening 3D patches of a 3D graphics model. For each vertex in each polygon of a plurality of polygons of a 3D patch from a 3D graphics model, a vector is determined from a seed point of the 3D patch to the vertex. An axis in a plane of the polygon that includes the seed point and is perpendicular to the vector is determined, and the vector rotated around the axis until the vector is in the plane of the polygon to generate a corresponding 2D vertex at the endpoint of the rotated vector in the plane. The determining a vector, determining an axis, and rotating the vector for each vertex in each polygon of the 3D patch generates a 2D patch of co-planar polygons corresponding to the polygons of the 3D patch, which is stored for use in a computer graphics application.

27 Claims, 8 Drawing Sheets

FLATTENING 3D IMAGES

BACKGROUND

1. Field of the Invention

The present invention is directed generally to image manipulation; and more particularly to a method for flattening 3-dimensional images.

2. Description of the Related Art

In recent years, image manipulation and graphical editing programs have become increasingly popular. These editing environments typically allow for the use of various two dimensional tools (e.g., drawing tools, brush tools, water tools, blurring tools, etc.), effects, and operations for manipulating two dimensional images.

As computing power has increased, the popularity and accessibility of three dimensional models and images have also increased. The graphical editing environments or programs mentioned above have accordingly incorporated the ability to manipulate three dimensional images, e.g., using tools specifically designed for modifying representations of three dimensional objects or models, referred to herein as 3-dimensional (3D) images. However, in order to paint on a 3D object (more generally, in order to apply texture map images to a 3D object), a flattened 2D representation of the object is needed. However, prior art techniques for flattening 3D images are generally complex, computationally expensive, and error prone, or introduce too much distortion.

SUMMARY

Various embodiments are presented of systems, methods, and computer-readable storage media for flattening 3-dimensional images are presented. For each vertex in each polygon of a plurality of polygons of a 3-dimensional (3D) patch from a 3D graphics model, a vector from a seed point of the 3-dimensional (3D) patch to the vertex of the 3D patch may be determined. An axis in a plane of the polygon that includes the seed point and is perpendicular to the vector may be determined, the vector rotated around the axis until the vector is in the plane of the polygon to generate a corresponding 2D vertex at the endpoint of the rotated vector in the plane. The determining a vector, determining an axis, and rotating the vector for each vertex in each polygon of the 3D patch may generate a 2D patch of co-planar polygons corresponding to the polygons of the 3D patch. The 2D patch may be stored for use in a computer graphics application.

Figure 1:
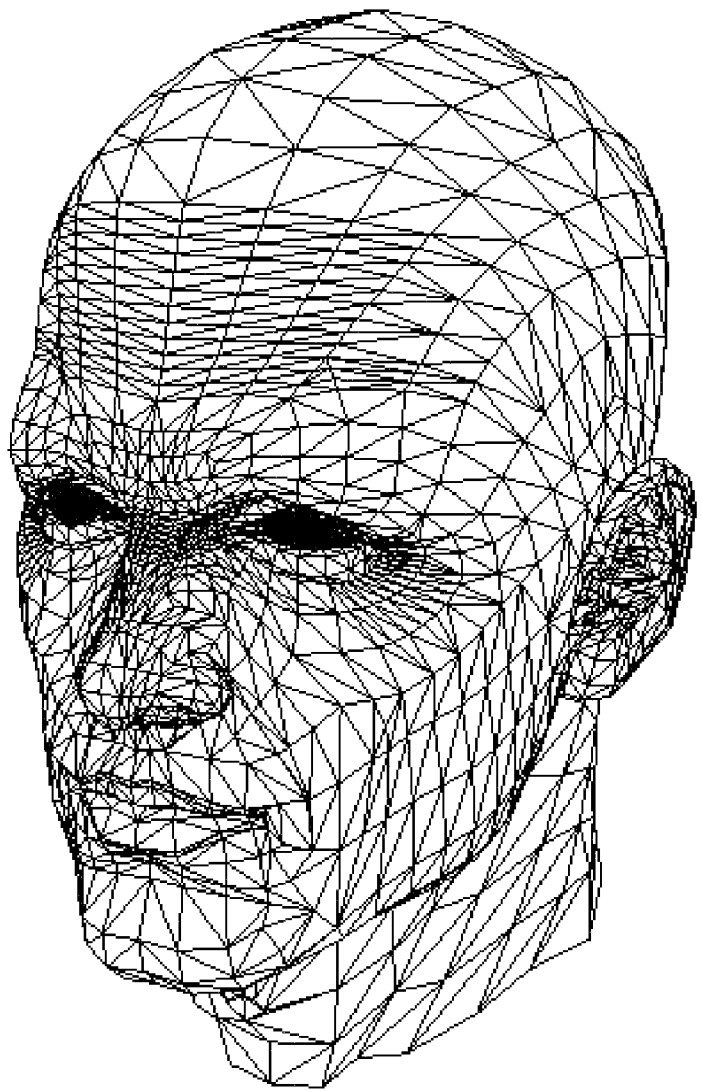
FIG. 1 illustrates a 3D graphics model or image, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Image editing may be defined as the process of altering digital images or illustrations. Digital image editing applications, executed on a computing device, may be the primary tool used to manipulate, enhance, transform, create and render images, such as digital photographs and computer art. Example implementations of image editing applications include Adobe Photoshop™ and Adobe Photoshop Express™, among other image editing programs. Image editors are widely used to perform transformation or image adjustment operations on digital images, such as rotating, cropping and selectively changing colors. Many other operations are possible. For example, digital image editing applications may be used to render and modify three dimensional objects or images, e.g., according to various embodiments described herein.

The tools image editing applications use to modify 3D graphics models or images, e.g., digital paintbrushes, pencils, etc., may be implemented with respect to 2D images. In other words, the application of color or drawing operations to the 3D graphics model may actually be performed, e.g., either explicitly, or "under the hood", by a 2D tool operating on a 2D representation of the 3D graphics model. Thus, such a 2D representation of the 3D graphics model may be required to manipulate the 3D image. However, when 3D graphics models are imported into a 3D image editing tool, such a 2D representation may not be provided, or perhaps the 2D representation that is provided is unacceptable or unusable. Thus, embodiments of the methods disclosed herein may be used to generate a 2D representation of a 3D graphics model or image.

Overview

The methods and systems described herein are directed towards flattening a 3D graphics model or image, e.g., for application of 2D texture maps to the 3D graphics model or image. As used herein, the terms 3D graphics model and 3D image may be used interchangeably, both referring to a set of 3D polygons representing a 3D object, which may or may not be rendered by a 3D rendering engine.

Consider the exemplary 3D graphics model of FIG. 1, which is a representation of a human head made up of triangles in a 3D space. As may be seen, the model includes regions of both high and low curvature. Such 3D graphics models may be separated or decomposed into sections, referred to as 3D patches, each including multiple polygons. Flattening the 3D graphics model may be performed by flattening these 3D patches.

Generally, the 3D patches may be determined in such a way as to minimize the total curvature of the patch, e.g., the total variation among the normal vectors of the polygons, as will be described below in more detail. Thus, patches for regions of high curvature may be smaller than patches for regions of low curvature. Note that in general, if patches are too large (i.e., include too much curvature), flattening them results in significant (unacceptable) distortion, and if the patches are too small, there may be too many visible errors, e.g., cracks, in the resulting model.

Figure 2:
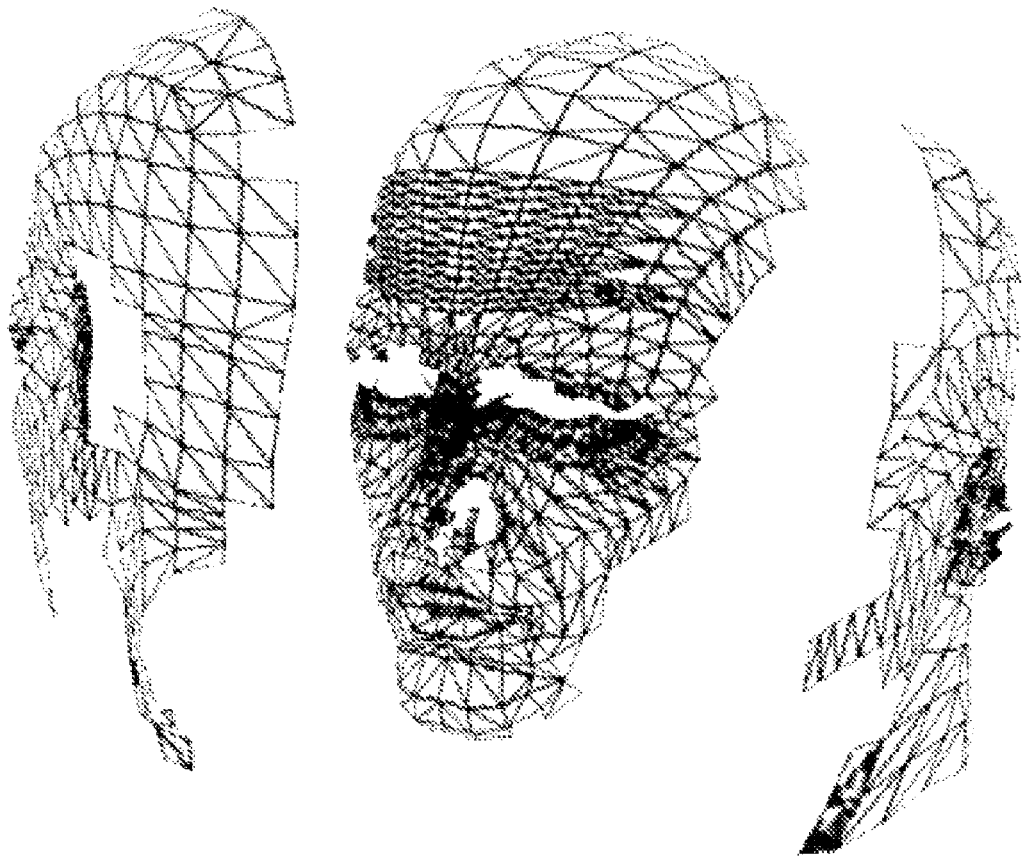
FIG. 2 illustrates exemplary division of the 3D graphics model of FIG. 1 into 3D patches, according to one embodiment.

FIG. 2 illustrates an exemplary (partial) set of patches for the 3D graphics model of FIG. 1, where only large primary patches are shown. As may be seen, these patches are not totally flat, but rather are just "close" to flat. It generally isn't practical to split the 3D graphics model up into totally flat patches or pieces, as this would generally require that each triangle be its own patch. For texture mapping, it is generally more helpful to the user to have fewer patches to deal with. Once these 3D patches are specified or constructed, each 3D patch may be flattened to generate corresponding 2D patches in accordance with embodiments of the method described below with reference to FIG. 4.

Figure 3:
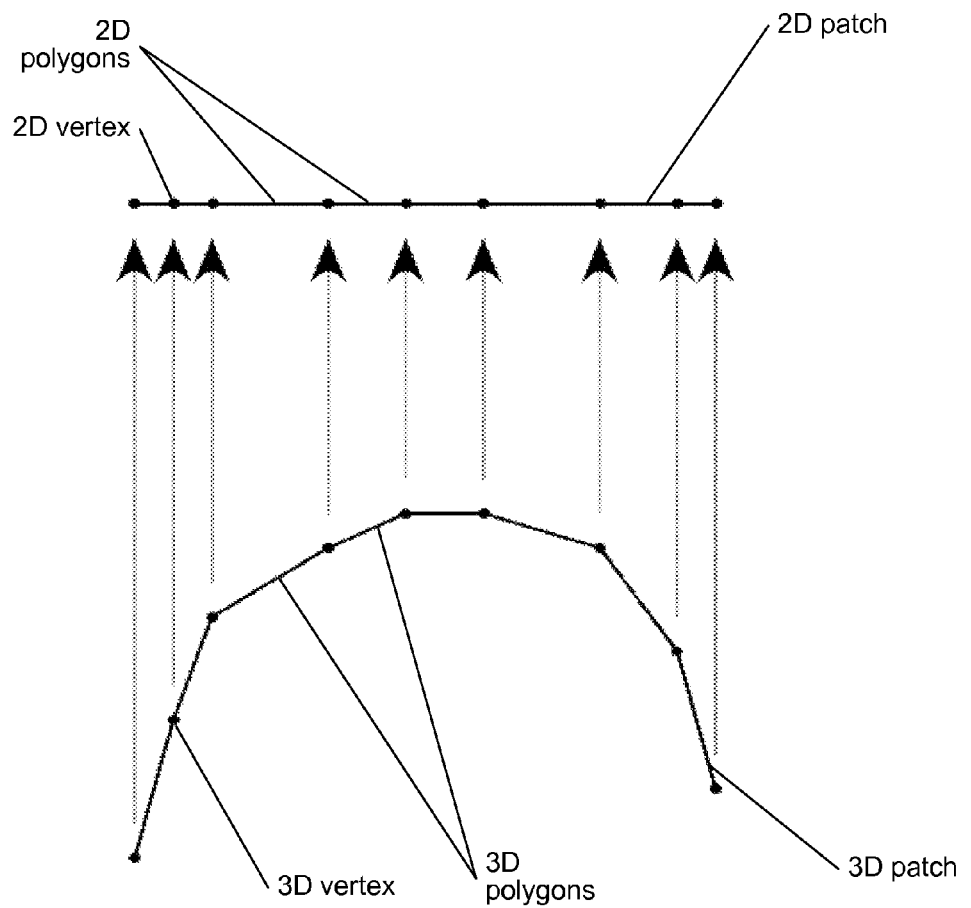
FIG. 3 illustrates one approach for flattening a 3D patch that introduces significant distortion.

There are numerous different ways to flatten patches, most of which are either ineffective or inefficient. For example, FIG. 3 illustrates an approach to flattening 3D patches that results in significant distortions. More specifically, the approach illustrated in FIG. 3 employs a simple projection from a 3D patch into a 2D plane. Note that for simplicity, the 3D patch is represented in 2D, and the 2D patch is represented in 1D. In other words, one dimension has been collapsed to provide an edge-on view of the patches (and constituent polygons). Note that the 3D patch is projected onto the plane of the middle polygon (referred to herein as the "reference polygon") of the 3D patch, and so projections of polygons that are substantially skewed from this plane will incur greater distortions (contractions) than those that are approximately parallel to the plane. Note that the 3D polygons (represented by line segments) near the middle of the 3D patch (and thus oriented similarly to the center polygon) project to 2D polygons (also represented by line segments) of similar size (length). However, the 3D polygons at the boundaries of the patch project to much shorter segments. This change in line segment length corresponds to distortion in the 3D polygons, e.g., triangles. The amount of distortion that occurs depends on how flat the patch was to begin with, and more specifically, on how the polygons deviate from the orientation of the plane of the reference polygon, i.e., the degree to which the polygons are not parallel to the reference polygon. As will be discussed below in more detail, a user may view and manipulate patches, e.g., as texture maps, or may draw or paint on the 3D graphics model, in mapping textures between the 2D patches and the 3D graphics model, distortions due to the mapping may result in blurring, stretching, shrinking, etc., of the textures being applied to the model. Thus, if a patch can be flattened with less distortion, larger patches that are not very flat to begin with could be accommodated. Larger patches benefit the user, and so minimizing distortion to accommodate larger patches is important.

Figure 4:
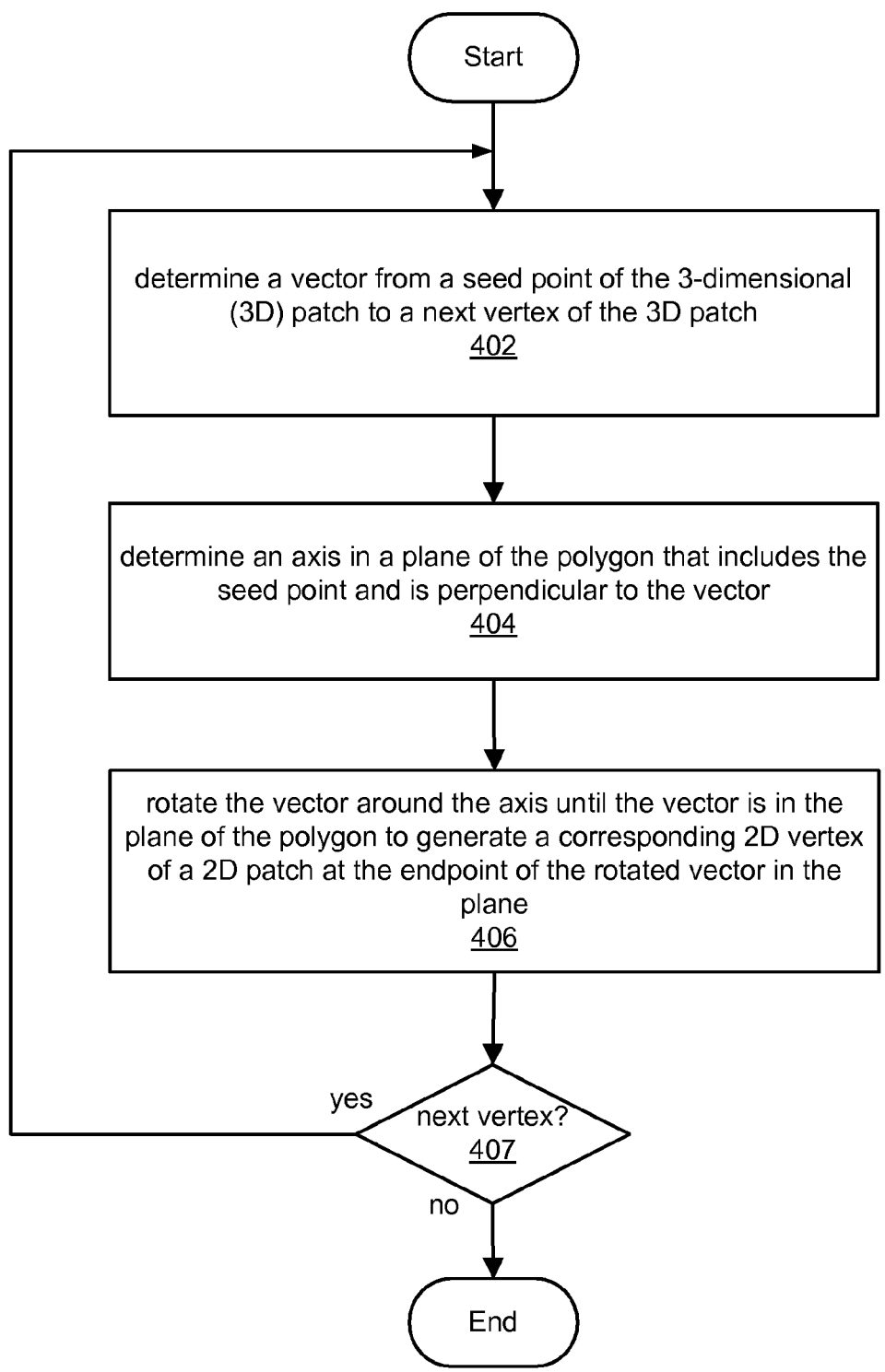
FIG. 4 is a flowchart of a method for flattening a 3D image, according to embodiments of the present invention.

FIG. 4—Method for Flattening 3D Patches

FIG. 4 is a flowchart illustrating embodiments of a method for flattening 3D images. The method shown in FIG. 4 may be used in conjunction with embodiments of the computer system shown in FIG. 9, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

In 402, a vector from a seed point of the 3D patch to the vertex of the 3D patch may be determined. The seed point may be a vertex of the 3D patch, or may be determined based on the vertices of the 3D patch. For example, in one embodiment, a polygon in the 3D patch may be selected based on any of a variety of criteria, e.g., proximity to the center of the patch, local curvature of the patch, e.g., the degree to which the orientation of a polygon differs from those of its neighbors, the similarity of local curvature to the average curvature of the patch, and so forth, among others, and the seed point selected or determined based on the selected polygon. This polygon may be referred to as a "reference polygon", because embodiments of the method disclosed herein utilize the plane of this polygon, as described below.

Figure 5:
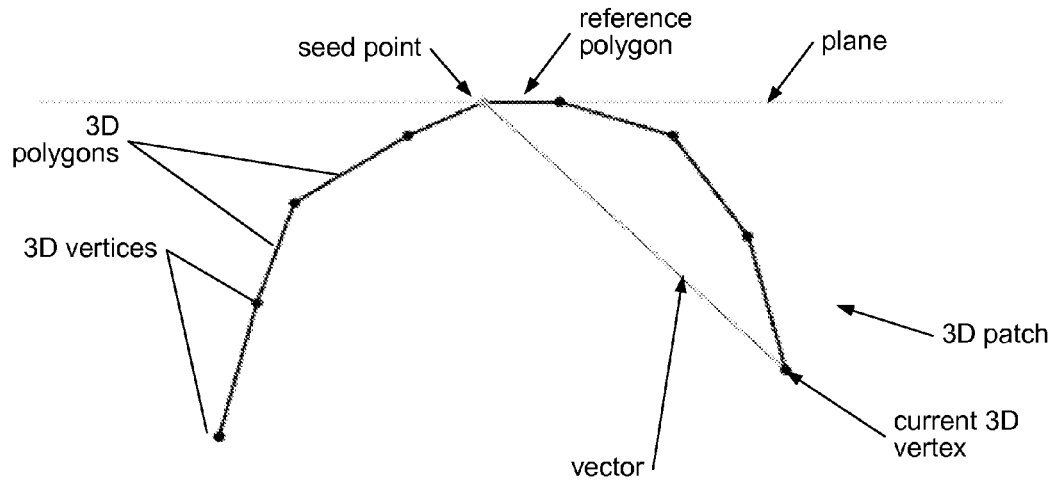
FIGS. 5 and 6 illustrate rotation of a patch vertex into the plane of a seed polygon, according to one embodiment.

In one embodiment, the 3D patch may have been constructed or "grown" from an initial polygon, as will be described below in more detail, and this initial polygon may be used to define the seed point, e.g., where one of the polygon's vertices is selected as the seed point, or, alternatively, where the center of the polygon is used as the seed point. Regardless of how the seed point is determined, in preferred embodiments, the seed point is in the plane of one of the polygons in the 3D patch, and may be considered to be included within the polygon. FIG. 5 illustrates an exemplary 3D patch where, as with FIG. 3, the 3D patch is represented in 2D, e.g., as a cross-section, for simplicity. As shown, the 3D patch includes a plurality of 3D polygons comprising 3D vertices, where one of the vertices has been designated as the seed point, and where a vector has been constructed from the seed point to a current vertex. Note that the plane of the reference polygon is represented by the horizontal line that passes through the reference polygon.

In 404, an axis in the plane of the polygon that includes the seed point and is perpendicular to the vector may be determined. In other words, an axis may be determined that is co-planar with the polygon and intersects the seed point, and that is orthogonal to the vector of 402.

Figure 6:
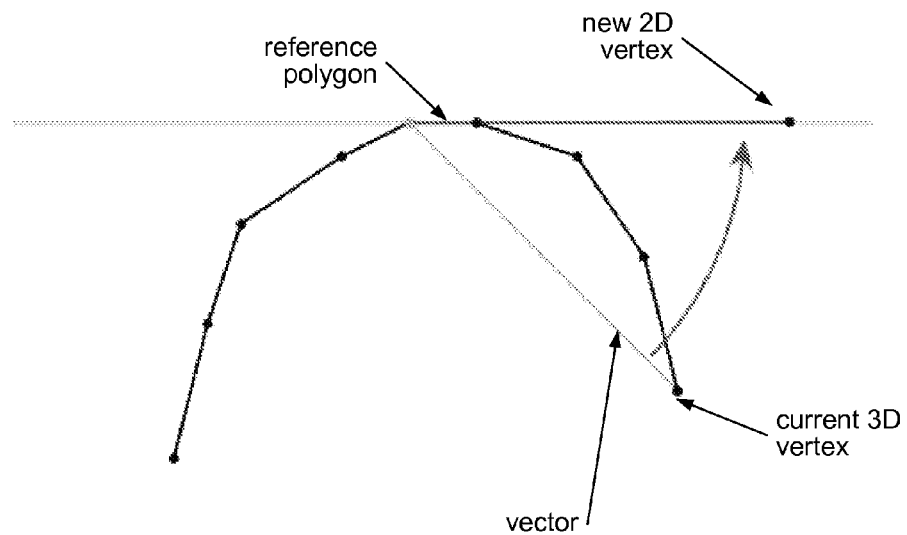

In 406, the vector may be rotated around the axis until the vector is in the plane of the polygon to generate a corresponding 2D vertex at the endpoint of the rotated vector in the plane. In other words, the vector to the 3D vertex may be rotated around the axis into the plane of the reference polygon, thereby defining a corresponding 2D vertex in the plane. FIG. 6 illustrates such vector rotation with respect to the 3D patch of FIG. 5, where, as may be seen, the resulting 2D vertex is in the plane of the reference polygon. Note that the distance from the seed point to the 3D vertex is preserved with respect to the new 2D vertex, i.e., the distance from the seed point to the new 2D vertex is the same.

In 407, a determination may be made as to whether there is another vertex in the 3D patch to process. If there are no further vertices in the 3D patch, the method may terminate. If there is another vertex in the 3D patch, the method may proceed back to method element 402 and continue as described above until all vertices in the 3D patch have been processed. The above-described determining a vector, determining an axis, and rotating the vector for each vertex in each polygon of the 3D patch (from a 3D graphics model) may generate a 2D patch of co-planar polygons corresponding to the polygons of the 3D patch. In other words, the process described above may be performed for each point in the patch, connecting a line between the vertex and the seed point, rotating that line into the same plane as the reference polygon, and finding the point's new position in the plane. Thus, by rotating each 3D vertex of the 3D patch into the plane of the reference polygon, a 2D patch that corresponds to the 3D patch may be generated, where the 2D patch is in the plane of the reference polygon.

Figure 7:
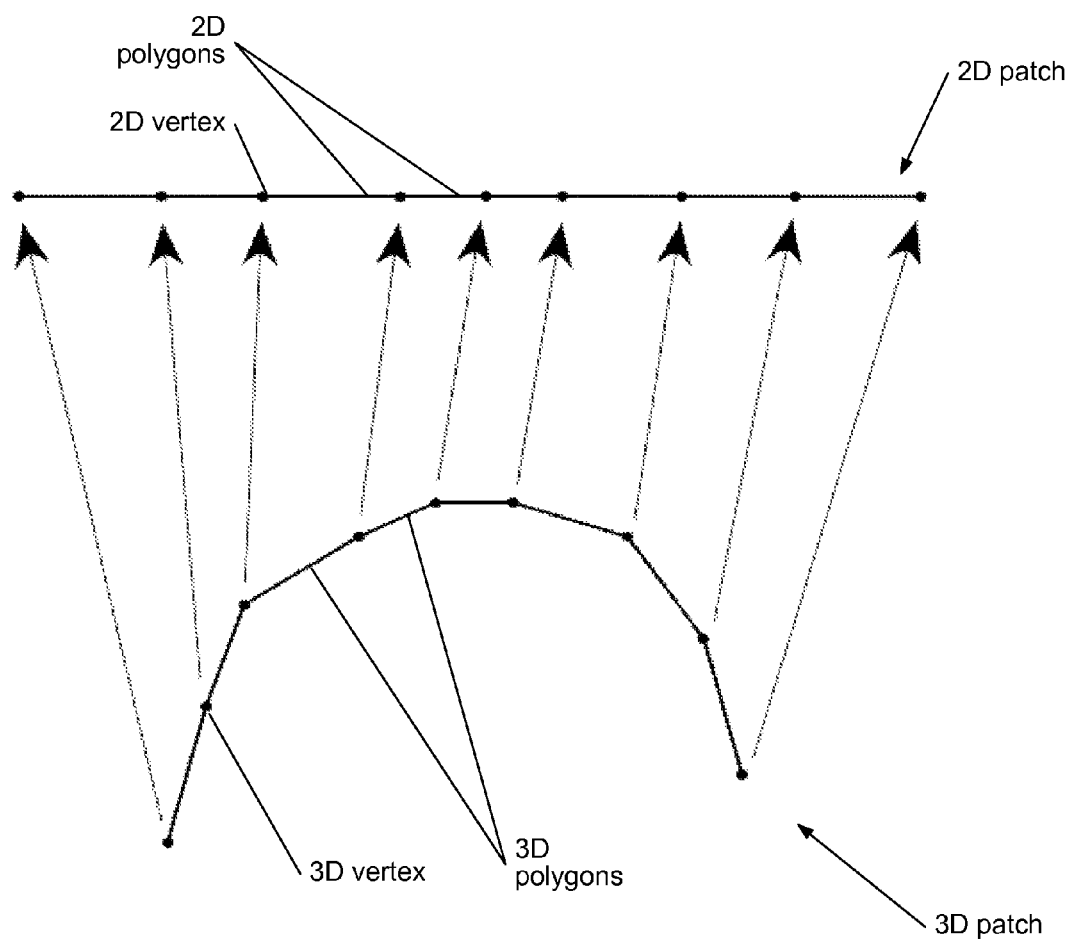
FIG. 7 illustrates generation of a 2D patch from the 3D patch of FIG. 3, according to one embodiment.

Note that since each 3D vertex belongs to two or more 3D polygons in the 3D patch, these polygonal membership relationships may be used to designate corresponding membership of the newly generated 2D vertices with respect to 2D polygons in the 2D patch that correspond one-to-one with the 3D polygons of the 3D patch. Said another way, the generated 2D patch includes 2D polygons and 2D vertices that map one-to-one to the 3D polygons and 3D vertices of the 3D map. FIG. 7 illustrates an exemplary 2D patch generated from a 3D patch, e.g., the 3D patch of FIGS. 3, 5, and 6, according to an embodiment of the method of FIG. 4. As FIG. 7 indicates, for each 3D vertex and polygon in the 3D patch, there is a corresponding 2D vertex and polygon in the 2D patch, indicated by the respective arrows pointing from the 3D vertices to their corresponding 2D vertices. Moreover, as FIG. 7 clearly shows, the distortion (contraction) of the polygons using the method of FIG. 4 is significantly less than that using the simple projection technique described with reference to FIG. 3. In other words, if this result is compared with the straight projection described with respect to FIG. 3, one can see that there is far less distortion (shortening) in the segments (polygons) of the 2D patch. Note that even the line segments near the ends approximately maintain their original length in the flattened version. Embodiments of the present method may thus be quick, efficient, and result in low distortion.

The 2D patch may be stored for use in a computer graphics application, e.g., in a memory medium. Note that in various embodiments, this storing of the 2D patch may be performed after the iterative mapping of 3D vertices to 2D vertices is complete, and/or may be performed as the vertices are mapped. For example, in one embodiment, each 2D vertex may be stored as it is generated. In one embodiment, each 2D vertex (and/or polygon) may be stored in the same data structure that holds the 3D vertex (and/or polygon) information. For example, a record may be defined that stores a 3D vertex, e.g., with x, y, and z values, and that also stores the corresponding 2D vertex, e.g., with u and v values. Of course, any other storage scheme may be used as desired.

Thus, embodiments of the above method may provide for generation of a 2D polygon patch from a 3D polygon patch, i.e., may be used to flatten 3D patches to generate corresponding 2D patches.

Further Embodiments

Various further embodiments of the above method are now described.

In some embodiments, the method may further include determining the 3D patch operated on in method elements 402-407 above. For example, in one embodiment, an initial polygon of the 3D graphics model may be selected, which may be referred to as a "seed polygon" for convenience. This polygon may be selected in any of a variety of ways. For example, in one embodiment, the polygon may be selected by a user, e.g., via a pointing device, or programmatically, e.g., automatically by software. The selection may be random, or may be based on regional attributes of the 3D graphics model, among other criteria. For example, in some embodiments, the seed polygon selected may not be in a sharp crease, pit, peak, or ridge, of the model surface. The seed polygon will be the first polygon of the patch being constructed.

A set of polygons that are directly or indirectly contiguous with the initial polygon and that differ in planar orientation from the initial polygon by a specified angle or less, may be determined, where the set of polygons and the initial polygon compose the 3D patch. In other words, polygons in the neighborhood of the seed polygon may be analyzed to determine those polygons whose planar orientation is within some specified angle of the plane of the initial or seed polygon, where each polygon analyzed is either adjacent to the initial polygon (directly contiguous), or is contiguous via one or more intervening polygons (indirectly contiguous). Note that it is the angle between each polygon and the seed polygon that determines how much distortion results from the 2D patch generation described above. Thus, the maximum degree of distortion allowed in the 2D patch may be controlled via specification of this limiting angle. Note further that specifying this angle automatically limits the size of patches via limiting the maximum total curvature of the patch. Thus, large gently curving portions of the 3D model may allow large patches, whereas more volatile areas, i.e., those with greater curvature, will automatically give rise to smaller patches, thus limiting the distortion in corresponding 2D patches.

It should be noted that analysis of the polygons may proceed according to any of various schemes. For example, in one embodiment, the polygons may be analyzed in a breadth first manner, i.e., where all adjacent neighbors are analyzed, then their adjacent neighbors, and so forth, terminating expansion in a given direction when the edge condition obtains, i.e., when a polygon's relative angle (with respect to the initial polygon) exceeds the specified limit angle, i.e., the threshold angle. In other embodiments, other search techniques may be used as desired, e.g., depth first, random, etc.

In some embodiments, the 3D patch may be comprised in a plurality of 3D patches from the 3D graphics model. These 3D patches may also be specified or created as described above. In other words, in some embodiments, the method may include determining others of the plurality of 3D patches (besides the 3D patch discussed above). Additionally, the method may also include generating corresponding 2D patches of co-planar polygons corresponding respectively to the polygons of the 3D patches according to embodiments of the method of FIG. 4. These 2D patches may also be stored for use in the computer graphics application. Thus, in some embodiments, a set of 2D patches may be generated based on a plurality of 3D patches from or of the 3D graphics model.

Figure 8:
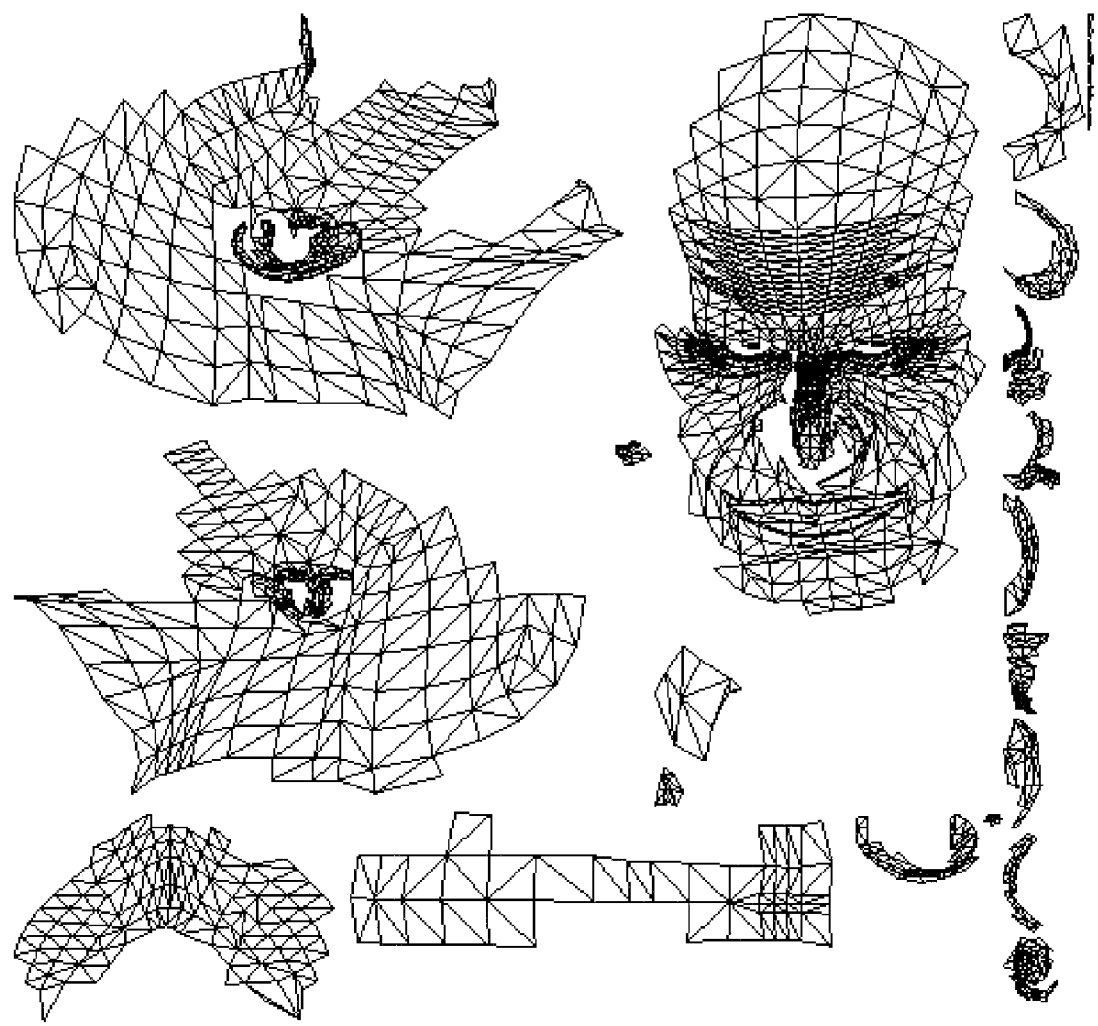
FIG. 8 illustrates flattened patches for the 3D graphics model of FIG. 1, according to some embodiments.

FIG. 8 illustrates an exemplary set of 2D patches generated from 3D patches from the graphics model of FIG. 1, including 2D patches corresponding to the primary 3D patches shown in FIG. 2. While some distortion may be apparent in these 2D patches, note that the distortion is small enough that the patches may generally be identified with portions of the 3D graphics model, e.g., one can see a respective patch for each side of the head, one for a large part of the front of the face, and various smaller patches, primarily associated with curvy detailed parts of the ears and lips.

The generated 2D patches may be used to manipulate the 3D graphics model. For example, in one embodiment, the 2D patch generated above according to the method of FIG. 4 may be or include a texture map for a corresponding portion of the 3D graphics model. A texture, i.e., a 2D bitmap or other 2D image, may be applied to or modified on the 2D patch, and the 3D graphics model may be rendered (by a rendering engine) in accordance with the texture map. In other words, the texture of the 2D patch, and any modifications thereof, may result in corresponding textures and texture modifications with respect to the 3D graphics model. Note that there may be some distortion of the textures when mapped to the 3D graphics model (e.g., by the rendering engine), but these distortions may be kept small by appropriate specification of the limiting angle, as discussed above.

In one embodiment, applying or modifying a texture for the 2D patch may include receiving user input via a 2D graphics tool to manipulate the texture for the 2D patch. In other words, a user may use a 2D graphics tool such as a 2D graphics paint brush, 2D drawing tool, 2D spray paint, 2D cut/paste operations, etc., to manipulate the 2D texture map directly, and the manipulated texture for the 2D patch may be displayed. These 2D graphical manipulations may then be mapped to the 3D graphics model and displayed, e.g., by the rendering engine. Note that this mapping may be automatic, or in response to invocation by the user. Thus, in some embodiments, the user may be able to paint or draw (or otherwise manipulate the 2D texture) on the 2D patch (or patches), and the resulting texture(s) may be mapped or transferred (possibly with some distortion) to the 3D graphics model and displayed.

In some embodiments where the user desires to manipulate the 2D patches, e.g., to paint the 3D graphics model, the graphics application may display the 2D patches in such a way as to facilitate intuitive manipulation of the 2D texture maps. For example, rather than the arrangement of patches in FIG. 8, the application may display the patches in a manner that retains as much of the geometric correspondence between patches as possible, e.g., in a similar manner as "exploded" CAD (computer-aided design) drawings, where the 3D geometric context of the 2D patches may be made apparent to the user, and/or the patches may be displayed with labels whereby the user may more easily identify which portion of the 3D graphic model a 2D patch corresponds to.

In some embodiments, the graphics application may provide 3D image manipulation tools, e.g., 3D graphics paint brushes, 3D spray paint, 3D drawing tools, etc., for manipulating the 3D graphics model that may depend on 2D graphics tools, e.g., 2D graphics paint brush, 2D drawing tool, 2D spray paint, etc., for their functionality. For example, user manipulations of the 3D graphics model may be translated or transformed to 2D manipulations of a 2D representation, which may then be mapped to the 3D graphics model, where the user may not be aware of the detour through the 2D representation.

Thus, in some embodiments, applying or modifying a texture for the 2D patch may include receiving user input via a 3D graphics tool to manipulate the 3D graphics model, and modifying the texture for the 2D patch based on the user input, which may then be rendered on the 3D graphics model. In other words, a user may use a 3D graphics tool such as a 3D graphics paint brush, 3D drawing tool, etc., to paint, draw, etc., on the 3D graphics model, which may automatically result in manipulations of the 2D texture on the 2D patch, and which may then be mapped or transferred to the 3D graphics model and displayed. Thus, the 2D patch/texture map may be used to implement 3D image manipulation tools. Note that the modified texture for the 2D patch may or may not be displayed to the user as desired.

Exemplary System

Figure 9:
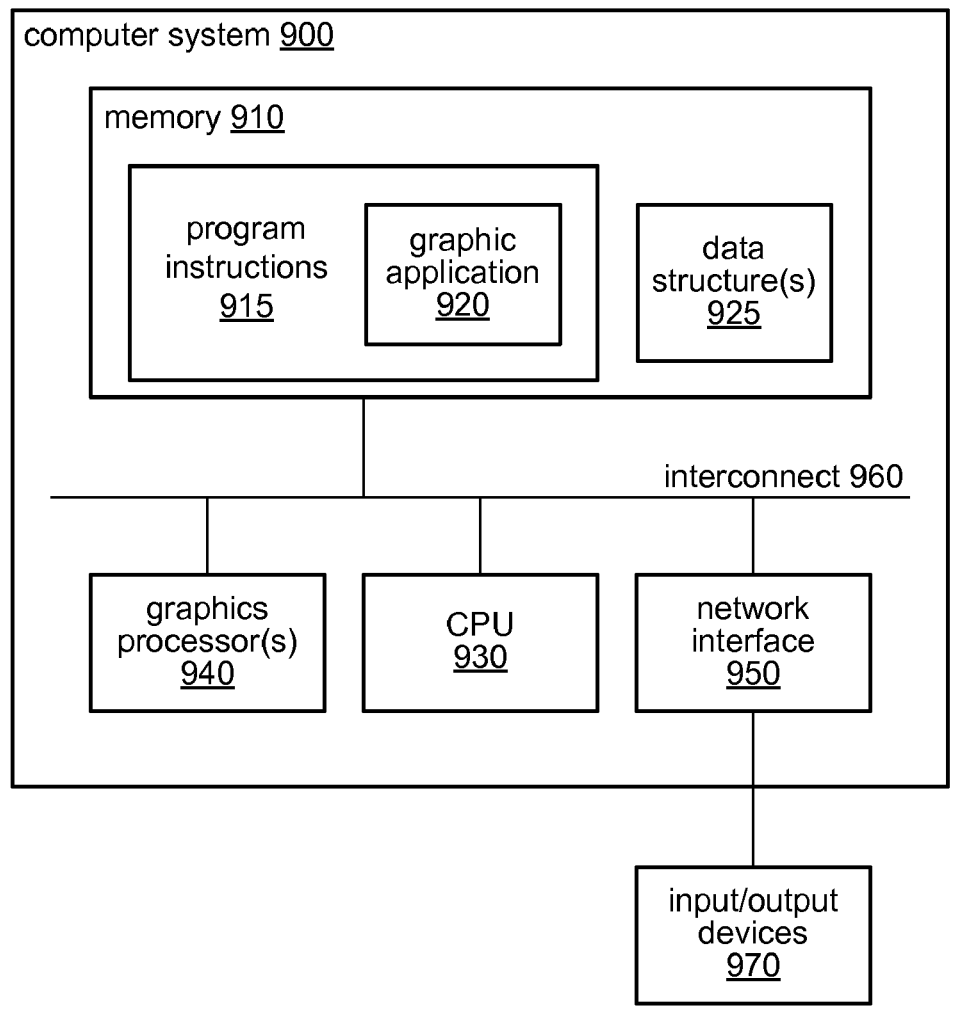
FIG. 9 illustrates an exemplary system configured to implement various embodiments described herein, according to one embodiment.

The techniques described herein may be implemented by a computer system configured to provide the functionality described. FIG. 9 is a block diagram illustrating one embodiment of a computer system 900 suitable for implementing such embodiments. A graphics editing program or application such as graphics application 920 may be configured to perform various embodiments described herein.

Graphics application 920 may represent various types of graphics applications, such as painting, modeling, image editing, video editing, publishing, photography, games, animation, and other applications. Additionally, graphics application 920 may utilize a graphics processor 940 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 940 may implement a number of graphics primitive operations in a way that makes executing them much faster than drawing directly to the screen with a host central processing unit (CPU), such as CPU 930. In various embodiments, the techniques disclosed herein may be implemented by program instructions configured for parallel execution on two or more such GPUs. The GPU 900 may implement one or more application programmer interfaces (APIs) that permit programmers to invoke the functionality of the GPU. Suitable GPUs may be commercially available from vendors such as NVIDIA Corporation, ATI Technologies, and others.

Functionality and/or features described herein as being part of, or performed by, graphics application 920 may, in some embodiments, be part of, or performed by, one or more graphics processors, such as graphics processor 940.

Various embodiments, as described herein, may be implemented on various types of computer systems. Referring again to FIG. 9, computer system 900 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 920, which may be configured to implement the techniques described herein, may be provided as a computer program product, or software, that may include a computer-readable storage medium having stored thereon instructions, which may be used to program a computer system (or other electronic devices) to implement embodiments described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 9, computer system 900 may include one or more processor units (CPUs) 930. Processors 930 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system (s) may be run on computer system 900, such as various versions of Unix, Linux, Windows™ from Microsoft Corporation, MacOS™ from Apple Corporation, or any other operating system that enables the operation of software on a hardware platform.

The computer system 900 may also include one or more system memories 910 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 900 via interconnect 960. Memory 910 may include other types of memory as well, or combinations thereof. One or more of memories 910 may include program instructions 915 executable by one or more of processors 930 to implement aspects of embodiments described herein. Program instructions 915, which may include program instructions configured to implement graphics application 920, may be partly or fully resident within the memory 910 of computer system 900 at any point in time. Alternatively, program instructions 915 may be provided to GPU 940 for performing functionality described herein. In some embodiments, the techniques described herein may be implemented by a combination of program instructions 915 executed on one or more processors 930 and one or more GPUs 940, respectively. Program instructions 915 may also be stored on an external storage device (not shown) accessible by the processor(s) 930 and/or GPU 940, in some embodiments. Any of a variety of such storage devices may be used to store the program instructions 915 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 930 and/or GPU 940 through one or more storage or I/O interfaces including, but not limited to, interconnect 960 or network interface 950, as described herein. In some embodiments, the program instructions 915 may be provided to the computer system 900 via any suitable computer-readable storage medium including memory 910 and/or external storage devices described above. Memory 910 may also be configured to implement one or more data structures 925, such as one or more acceleration data structures and/or structures configured to store data representing one or more input images, output images, or intermediate images. Data structures 925 may be accessible by processor(s) 930 and/or GPU 940 when executing graphics application 920 or other program instructions 915.

As shown in FIG. 9, processor(s) 930 may be coupled to one or more of the other illustrated components by at least one communications bus, such as interconnect 960 (e.g., a system bus, LDT, PCI, ISA, or other communication bus type), and a network interface 950 (e.g., an ATM interface, an Ethernet interface, a Frame Relay interface, or other interface). The CPU 930, the network interface 950, and the memory 910 may be coupled to the interconnect 960. It should also be noted that one or more components of system 900 might be located remotely and accessed via a network.

As noted above, in some embodiments, memory 910 may include program instructions 915, comprising program instructions configured to implement graphics application 920, as described herein. Graphics application 920 may be implemented in various embodiments using any desired programming language, scripting language, or combination of programming languages and/or scripting languages, e.g., C, C++, C#, Java™, Perl, etc. For example, in one embodiment, graphics application 920 may be JAVA based, while in another embodiments, it may be implemented using the C or C++ programming languages. In other embodiments, graphics application 920 may be implemented using specific graphic languages specifically for developing programs executed by specialize graphics hardware, such as GPU 940. In addition, graphics application 920 may be embodied on memory specifically allocated for use by graphics processor(s) 940, such as memory on a graphics board including graphics processor(s) 940. Thus, memory 910 may represent dedicated graphics memory as well as general-purpose system RAM, in various embodiments. Memory 910 may in some embodiments also include a data store configured to store image data for one or more input images and/or output images, in various embodiments. Other information not described herein may be included in memory 910 and may be used to implement the methods described herein and/or other functionality of computer system 900.

Network interface 950 may be configured to enable computer system 900 to communicate with other computers, systems or machines, such as across a network. Network interface 950 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 900 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 950 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 940 may be implemented in a number of different physical forms. For example, GPU 940 may take the form of a dedicated graphics card, an integrated graphics solution and/or a hybrid solution. GPU 940 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 9, memory 910 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 940 and the rest of the computer system 900 may travel through a graphics card slot or other interface, such as interconnect 960 of FIG. 9.

Computer system 900 may also include one or more additional I/O interfaces, such as interfaces for one or more user input devices 970, or such devices may be coupled to computer system 900 via network interface 950. For example, computer system 900 may include interfaces to a keyboard, a mouse or other cursor control device, a joystick, or other user input devices 970, in various embodiments. Additionally, the computer system 900 may include one or more displays (not shown), coupled to processors 930 and/or other components via interconnect 960 or network interface 950. Such input/output devices may be configured to allow a user to interact with graphics application 920 to perform various image processing functionality described herein and/or to specify various parameters, thresholds, and/or other configurable options available to the user when using graphic application 920. It will be apparent to those having ordinary skill in the art that computer system 900 may also include numerous other elements not shown in FIG. 9.

Note that program instructions 915 may be configured to implement a graphic application 920 as a stand-alone application, or as a module of another graphics application or graphics library, in various embodiments. For example, in one embodiment program instructions 915 may be configured to implement graphics applications such as painting, editing, publishing, photography, games, animation, and/or other applications, and may be configured to perform embodiments of the methods disclosed herein. In another embodiment, program instructions 915 may be configured to implement the techniques described herein in one or more functions called by another graphics application executed on GPU 940 and/or processor(s) 930. Program instructions 915 may also be configured to render images and present them on one or more displays as the output of an operation and/or to store image data in memory 910 and/or an external storage device(s), in various embodiments.

While various techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the description be interpreted to embrace all such variations and modifications.

What is claimed is:

1. A computer-implemented method, comprising:
   performing, by one or more computing devices:
     for each vertex in each polygon of a plurality of polygons of a 3-dimensional (3D) patch from a 3D graphics model:
       determining a vector from a seed point of the 3-dimensional (3D) patch to the vertex of the 3D patch;
       determining an axis in a plane of the polygon that includes the seed point and is perpendicular to the vector; and
       rotating the vector around the axis until the vector is in the plane of the polygon to generate a corresponding 2D vertex at the endpoint of the rotated vector in the plane;
     wherein said determining a vector, said determining an axis, and said rotating the vector for each vertex in each polygon of the 3D patch generates a 2D patch of co-planar polygons corresponding to the polygons of the 3D patch; and
     storing the 2D patch for use in a computer graphics application.

2. The method of claim 1, further comprising:
   determining the 3D patch.

3. The method of claim 2, wherein said determining the 3D patch comprises:
   selecting an initial polygon of the 3D graphics model; and
   determining a set of polygons that are directly or indirectly contiguous with the initial polygon and that differ in planar orientation from the initial polygon by a specified angle or less, wherein the set of polygons and the initial polygon compose the 3D patch.

4. The method of claim 3, wherein the 3D patch is comprised in a plurality of 3D patches from the 3D graphics model, the method further comprising:
   determining others of the plurality of 3D patches; and
   generating corresponding 2D patches of co-planar polygons corresponding respectively to the polygons of the 3D patches; and
   storing the 2D patches for use in the computer graphics application.

5. The method of claim 1, further comprising:
   applying or modifying a texture on the 2D patch, wherein the 2D patch comprises a texture map for a corresponding portion of the 3D graphics model; and
   rendering the 3D graphics model in accordance with the texture map.

6. The method of claim 5, wherein said applying or modifying a texture for the 2D patch comprises:
   receiving user input via a 2D graphics tool to manipulate the texture for the 2D patch.

7. The method of claim 6, further comprising:
   displaying the manipulated texture for the 2D patch.

8. The method of claim 5, wherein said applying or modifying a texture for the 2D patch comprises:
  receiving user input via a 3D graphics tool to manipulate the 3D graphics model;
  modifying the texture for the 2D patch based on the user input.

9. The method of claim 8, further comprising:
  displaying the modified texture for the 2D patch.

10. A non-transitory computer accessible memory medium storing program instructions executable by a processor to implement:
  for each vertex in each polygon of a plurality of polygons of a 3-dimensional (3D) patch from a 3D graphics model:
    determining a vector from a seed point of the 3-dimensional (3D) patch to the vertex of the 3D patch;
    determining an axis in a plane of the polygon that includes the seed point and is perpendicular to the vector; and
    rotating the vector around the axis until the vector is in the plane of the polygon to generate a corresponding 2D vertex at the endpoint of the rotated vector in the plane;
  wherein said determining a vector, said determining an axis, and said rotating the vector for each vertex in each polygon of the 3D patch generates a 2D patch of co-planar polygons corresponding to the polygons of the 3D patch; and
  storing the 2D patch for use in a computer graphics application.

11. The memory medium of claim 10, wherein the program instructions are further executable to implement:
  determining the 3D patch.

12. The memory medium of claim 11, wherein said determining the 3D patch comprises:
  selecting an initial polygon of the 3D graphics model; and
  determining a set of polygons that are directly or indirectly contiguous with the initial polygon and that differ in planar orientation from the initial polygon by a specified angle or less, wherein the set of polygons and the initial polygon compose the 3D patch.

13. The memory medium of claim 12, wherein the 3D patch is comprised in a plurality of 3D patches from the 3D graphics model, wherein the program instructions are further executable to implement:
  determining others of the plurality of 3D patches; and
  generating corresponding 2D patches of co-planar polygons corresponding respectively to the polygons of the 3D patches; and
  storing the 2D patches for use in the computer graphics application.

14. The memory medium of claim 10, wherein the program instructions are further executable to implement:
  applying or modifying a texture on the 2D patch, wherein the 2D patch comprises a texture map for a corresponding portion of the 3D graphics model; and
  rendering the 3D graphics model in accordance with the texture map.

15. The memory medium of claim 14, wherein said applying or modifying a texture for the 2D patch comprises:
  receiving user input via a 2D graphics tool to manipulate the texture for the 2D patch.

16. The memory medium of claim 15, wherein the program instructions are further executable to implement:
  displaying the manipulated texture for the 2D patch.

17. The memory medium of claim 14, wherein said applying or modifying a texture for the 2D patch comprises:
  receiving user input via a 3D graphics tool to manipulate the 3D graphics model;
  modifying the texture for the 2D patch based on the user input.

18. The memory medium of claim 17, wherein the program instructions are further executable to implement:
  displaying the modified texture for the 2D patch.

19. A system, comprising:
  a processor;
  a display coupled to the processor; and
  a memory medium storing program instructions executable by the processor to:
    for each vertex in each polygon of a plurality of polygons of a 3-dimensional (3D) patch from a 3D graphics model:
      determine a vector from a seed point of the 3-dimensional (3D) patch to the vertex of the 3D patch;
      determine an axis in a plane of the polygon that includes the seed point and is perpendicular to the vector; and
      rotate the vector around the axis until the vector is in the plane of the polygon to generate a corresponding 2D vertex at the endpoint of the rotated vector in the plane;
    wherein said determining a vector, said determining an axis, and said rotating the vector for each vertex in each polygon of the 3D patch generates a 2D patch of co-planar polygons corresponding to the polygons of the 3D patch; and
    store the 2D patch for use in a computer graphics application.

20. The system of claim 19, wherein the program instructions are further executable to:
  determine the 3D patch.

21. The system of claim 20, wherein to determine the 3D patch the program instructions are executable to:
  select an initial polygon of the 3D graphics model; and
  determine a set of polygons that are directly or indirectly contiguous with the initial polygon and that differ in planar orientation from the initial polygon by a specified angle or less, wherein the set of polygons and the initial polygon compose the 3D patch.

22. The system of claim 21, wherein the 3D patch is comprised in a plurality of 3D patches from the 3D graphics model, wherein the program instructions are further executable to:
  determine others of the plurality of 3D patches; and
  generate corresponding 2D patches of co-planar polygons corresponding respectively to the polygons of the 3D patches; and
  store the 2D patches for use in the computer graphics application.

23. The system of claim 19, wherein the program instructions are further executable to:
  apply or modify a texture on the 2D patch, wherein the 2D patch comprises a texture map for a corresponding portion of the 3D graphics model; and
  render the 3D graphics model in accordance with the texture map.

24. The system of claim 23, wherein said applying or modifying a texture for the 2D patch comprises:
  receiving user input via a 2D graphics tool to manipulate the texture for the 2D patch.

25. The system of claim 24, wherein the program instructions are further executable to implement:
  displaying the manipulated texture for the 2D patch.

26. The system of claim 23, wherein said applying or modifying a texture for the 2D patch comprises:
   receiving user input via a 3D graphics tool to manipulate the 3D graphics model;
   modifying the texture for the 2D patch based on the user input.

27. The system of claim 26, wherein the program instructions are further executable to:
   display the modified texture for the 2D patch.

* * * * *